United States Patent
Lake et al.

(10) Patent No.: US 9,425,470 B2
(45) Date of Patent: Aug. 23, 2016

(54) ENERGY DISSIPATION DEVICE FOR CONTROLLING FLOW OF A FUEL CELL FLUID

(75) Inventors: Jeffrey G. Lake, Vernon, CT (US); Yu Guo, Shanghai (CN); Xiangyang Deng, Beijing (CN); Ying Shi, Shanghai (CN); Lei Yu, Shanghai (CN); George S. Hirko, Manchester, CT (US); Vicky Zhang, Shanghai (CN); Robin J. Guthrie, East Hartford, CT (US); Sushant S. Bhadange, Vernon, CT (US); Andrew Joseph Melough, South Windsor, CT (US)

(73) Assignee: Doosan Fuel Cell America, Inc., Atlanta, GA (US)

( * ) Notice: Subject to any disclaimer, the term of this patent is extended or adjusted under 35 U.S.C. 154(b) by 343 days.

(21) Appl. No.: 14/113,497

(22) PCT Filed: May 2, 2011

(86) PCT No.: PCT/US2011/034716
§ 371 (c)(1),
(2), (4) Date: Oct. 23, 2013

(87) PCT Pub. No.: WO2012/150923
PCT Pub. Date: Nov. 8, 2012

(65) Prior Publication Data
US 2014/0051001 A1    Feb. 20, 2014

(51) Int. Cl.
*H01M 8/04* (2016.01)
*H01M 8/08* (2016.01)
(Continued)

(52) U.S. Cl.
CPC ..... *H01M 8/04029* (2013.01); *H01M 8/04074* (2013.01); *H01M 8/0267* (2013.01); *H01M 8/04768* (2013.01); *H01M 8/086* (2013.01); *H01M 8/2465* (2013.01); *Y02E 60/50* (2013.01)

(58) Field of Classification Search
CPC .......... H01M 8/04029; H01M 8/086; H01M 8/2465; H01M 8/0267; H01M 8/04074; H01M 8/04768; Y02E 60/50
See application file for complete search history.

(56) References Cited

U.S. PATENT DOCUMENTS

| 4,506,423 A | * | 3/1985 | Nakamura | ............. | B21D 26/14 138/149 |
| 7,527,356 B2 | | 5/2009 | Sato | | |

(Continued)

FOREIGN PATENT DOCUMENTS

| JP | 6-281763 | 7/1994 |
| JP | 7-227595 | 8/1995 |

(Continued)

OTHER PUBLICATIONS

International Search Report and Written Opinion for PCT/US2011/034716 dated Jan. 10, 2012.

(Continued)

*Primary Examiner* — Carlos Barcena
*Assistant Examiner* — Lilia V Nedialkova
(74) *Attorney, Agent, or Firm* — Carlson, Gaskey & Olds, P.C.

(57) ABSTRACT

An example energy dissipation device for controlling a fuel cell fluid includes a conduit extending in longitudinal direction between a first opening and a second opening. A flow control insert is configured to be received within the conduit. The flow control insert is configured to cause a fuel cell fluid to flow helically relative to the longitudinal direction.

17 Claims, 5 Drawing Sheets

(51) Int. Cl.
*H01M 8/24* (2016.01)
*H01M 8/02* (2016.01)

(56) References Cited

U.S. PATENT DOCUMENTS

| | | | |
|---|---|---|---|
| 9,048,465 B2 | 6/2015 | Bang et al. | |
| 2003/0013004 A1* | 1/2003 | Oyanagi | H01M 4/921 429/481 |
| 2007/0218332 A1* | 9/2007 | Suzuki | H01M 8/04029 429/434 |
| 2007/0224565 A1* | 9/2007 | Briselden | F23C 3/002 431/207 |
| 2008/0050628 A1* | 2/2008 | Lee | H01M 8/04029 429/437 |
| 2010/0173209 A1 | 7/2010 | Jayaraman et al. | |
| 2011/0081589 A1* | 4/2011 | Fargo | H01M 8/04007 429/433 |

FOREIGN PATENT DOCUMENTS

| | | |
|---|---|---|
| JP | H07-227595 A | 8/1995 |
| JP | 7326378 | 12/1995 |
| JP | 2004185924 A | 7/2004 |
| JP | 2004186118 A | 7/2004 |
| JP | 2005006732 A | 1/2005 |
| JP | 2007227595 A | 9/2007 |
| JP | 2009274045 A | 11/2009 |
| JP | 2009275609 | 11/2009 |
| KR | 20070024829 | 3/2007 |

OTHER PUBLICATIONS

International Preliminary Report on Patentability for International Application No. PCT/US2011/034716 dated Nov. 14, 2013.

\* cited by examiner

ENERGY DISSIPATION DEVICE FOR CONTROLLING FLOW OF A FUEL CELL FLUID

CROSS-REFERENCE TO RELATED APPLICATIONS

This application is the U.S. national phase of PCT/US2011/034716, filed May 2, 2011.

BACKGROUND

This disclosure relates generally to fuel cells and, more particularly, to managing a flow of fuel cell fluid.

DESCRIPTION OF RELATED ART

Fuel cell stack assemblies are well known. In some examples, the fuel cell stack includes a multiple of fuel cell units. Each fuel cell unit includes a multitude of electrode assemblies. Each of the electrode assemblies has a phosphoric acid layer that acts as an electrolyte. The electrolyte layer is positioned between electrodes. One of the electrodes operates as an anode. The other electrode operates as a cathode. In one example, a fuel cell unit may include eight electrode assemblies arranged between cooler plates. Pressure plates are located adjacent each cooler plate to complete the stack assembly and hold the individual cells between them.

As known, fuel cell units utilize a fuel supply (e.g., hydrogen and air) and may generate liquid (e.g., water) and thermal byproducts. Liquid coolant is often used to remove thermal byproducts from the fuel cell unit. In phosphoric acid fuel cell units, liquid coolant is communicated through the cooler plates to remove thermal byproducts from the fuel cell units. Water is often used as a coolant in phosphoric acid fuel cells. In other types of fuel cell units (e.g., solid oxide fuel cell units), water is not used because those fuel cell units operate at a much higher temperature than phosphoric acid fuel cell units.

Coolant typically communicates to the fuel cell stack assembly through a manifold. The coolant then communicates from the manifold, through energy dissipation devices to each of the cooler plates within the fuel cell stack assembly. Fuel cell stack assemblies utilize energy dissipation devices to control delivery of the coolant to the individual cooler plates. The energy dissipation devices are often costly, complex, and difficult to manufacture.

SUMMARY

An example energy dissipation device for controlling a fuel cell fluid includes a conduit extending in longitudinal direction between a first opening and a second opening. A flow control insert is configured to be received within the conduit. The flow control insert is configured to cause a fuel cell fluid to flow helically relative to the longitudinal direction.

An example fuel cell arrangement includes a fuel cell fluid supply and a fuel cell stack. An energy dissipation device is configured to control the flow of fuel cell fluid between the fuel cell fluid supply and the fuel cell stack. The energy dissipation device includes an insert that causes the fuel cell fluid to flow circumferentially through the energy dissipation device.

An example method of controlling a fuel cell fluid flow includes receiving a fuel cell fluid at a conduit, restricting flow of the fuel cell fluid by directing the fuel cell fluid to move helically within the conduit, and communicating the fuel cell fluid from the conduit to a fuel cell stack.

These and other features of the disclosed examples can be best understood from the following specification and drawings, the following of which is a brief description.

DETAILED DESCRIPTION

Figure 1:
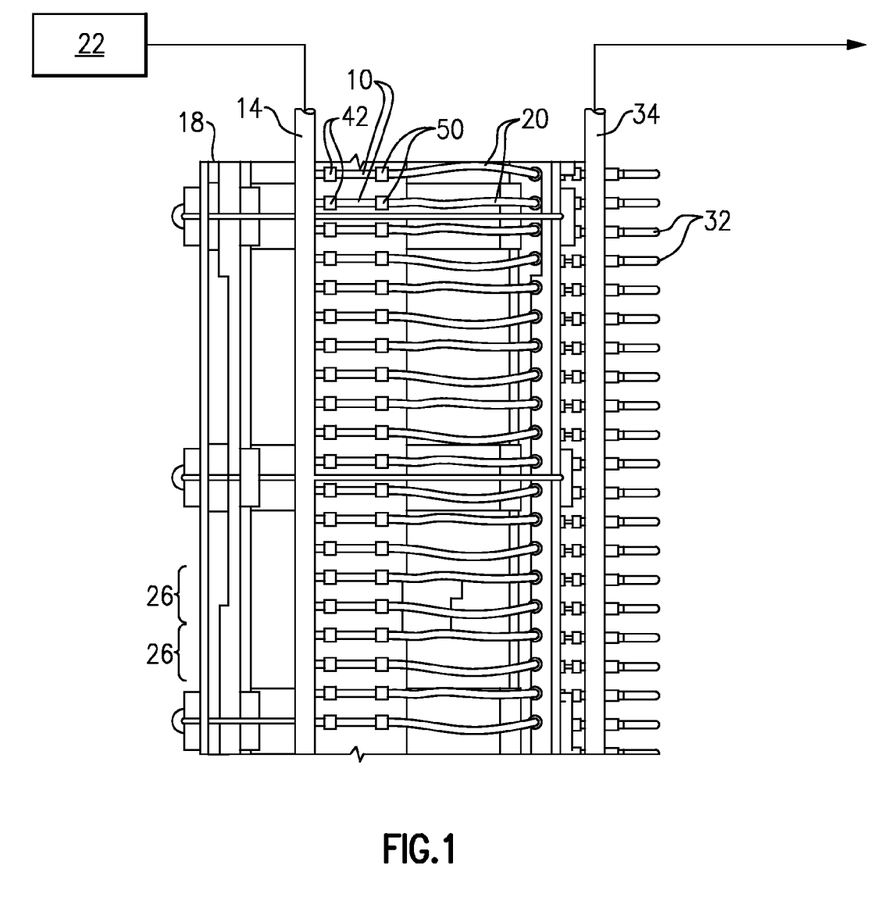
FIG. 1 shows an example fuel cell stack assembly having a multiple of energy dissipation devices.
Figure 2:
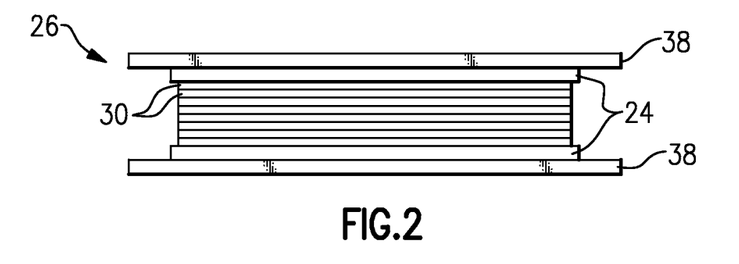
FIG. 2 shows a schematic view of an example phosphoric fuel cell unit from the FIG. 1 fuel cell stack assembly.
Figure 3:
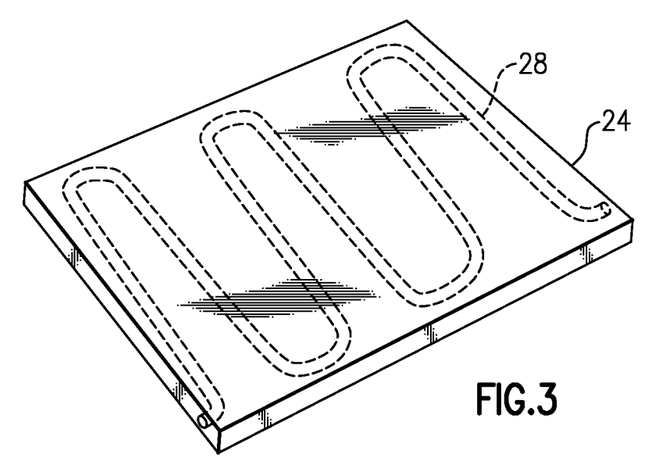
FIG. 3 shows a perspective view of a cooling plate from the FIG. 2 fuel cell unit.

Referring to FIGS. 1-3, energy dissipation devices 10 control flow of a fuel cell fluid between a manifold 14 and a fuel cell stack assembly 18. In this example, the fuel cell fluid is water, which is provided by a supply 22. In other examples, the energy dissipation devices 10 communicate other types of fluids. The example energy dissipation devices 10 restrict flow of the fuel cell fluid to the fuel cell stack assembly 18.

In this example, the fuel cell fluid communicates from the energy dissipation devices 10 through hoses 20. The example energy dissipation devices 10 each communicate the fuel cell fluid to a single one of the hoses 20. In another example, each of the energy dissipation devices 10 communicates the fuel cell fluid to more than one of the hoses 20 using a splitter connector, for example.

The fuel cell fluid flows from the hoses 20 to a plurality of cooling plates 24 within the fuel cell stack assembly 18. The fuel cell fluid circulates through a path 28 in the cooling plates 24. The fuel cell fluid then flows from the path 28 to hoses 32. The fuel cell fluid flows from the hoses 32 to a manifold 34, which communicates the fuel cell fluid away from the fuel cell stack assembly 18.

The example fuel cell stack assembly 18 includes several individual fuel cell units 26. In this example, each of the fuel cell units 26 includes eight phosphoric acid electrode assemblies 30 stacked on top of each other. Each fuel cell unit 26 also includes opposing pressure plates 38 and opposing cooling plates 24.

The electrode assemblies 30 are sandwiched between the opposing cooling plates 24. As known, thermal energy is generated by reactions within the electrode assemblies 30. The fuel cell fluid communicated through the path 28 in the cooling plate 24 is used to carry thermal energy away from the electrode assemblies 30. The cooling plates 24 are held by opposing pressure plates 38.

In this example, each of the energy dissipation devices 10 are held relative to the manifold 14 by a first Swagelock® device 42. Each of the energy dissipation devices 10 are held relative to the hoses 20 by a second Swagelock® device 50. In another example, the energy dissipation devices 10 are directly welded to the manifold 14 and held relative to the hoses 20 using an adhesive. Other examples include other manners of securing the energy dissipation devices 10.

Figure 4:
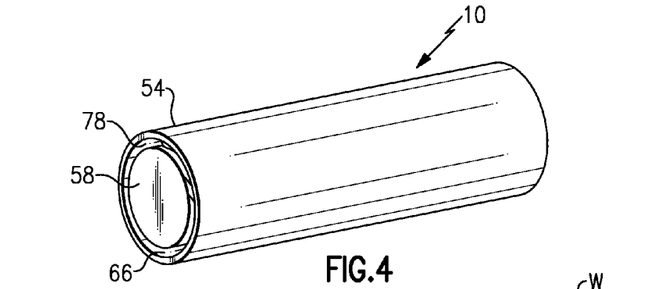
FIG. 4 shows a perspective view of an example energy dissipation device used in the FIG. 1 fuel cell stack assembly.
Figure 4A:
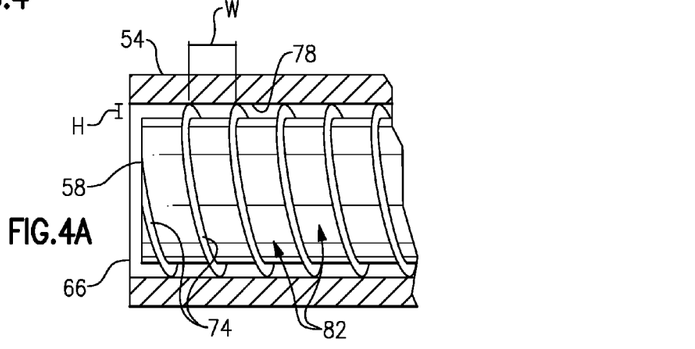
FIG. 4A shows a partial cutaway view of a portion of the FIG. 4 energy dissipation device.
Figure 5:
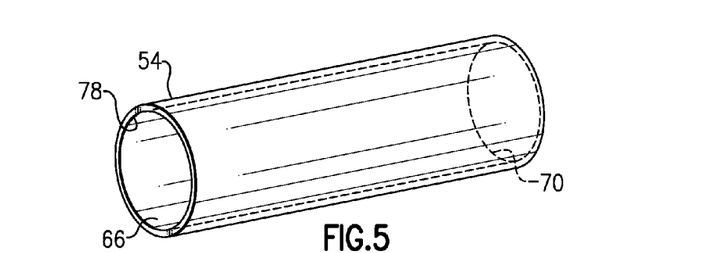
FIG. 5 shows a perspective view of a conduit of the FIG. 4 energy dissipation device.
Figure 5A:
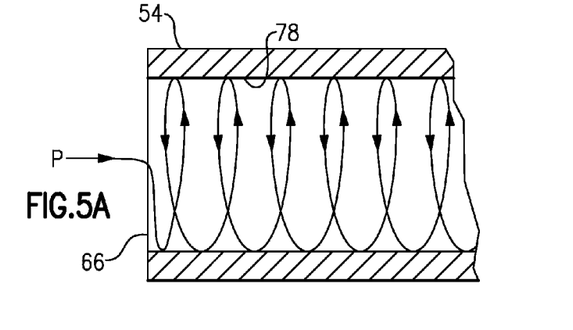
FIG. 5A shows a partial cutaway view of a portion of the FIG. 5 conduit.

Referring now to FIGS. 4-5B with continuing reference to FIG. 2, each of the example energy dissipation devices 10 includes a conduit 54 and a flow control insert 58. The conduit 54 is cylindrical and extends in a longitudinal direction from a first opening 66 to a second opening 70. The insert 58 is configured to be received within the conduit 54.

The insert 58 is a threaded rod in this example. That is, a plurality of threads 74 extend radially outward from an outer periphery of the insert 58. During assembly of the energy dissipation device 10, the insert 58 is press-fit within the conduit 54. The example conduit 54 and the example insert 58 are both made of stainless steel material. Other examples may utilize different materials depending on specific needs or availability.

In this example, the conduit openings 66 and 70 are about 0.75 inch (1.905 cm) in diameter. The diameter of the insert 58 is slightly larger than 0.75 inch. As a result, the threads 74, an inner wall 78 of the conduit 54, or both are deformed slightly as the insert 58 is received within the conduit 54. The insert 58 is thus held relative to the conduit 54 by an interference fit or friction between the parts. A person having skill in this art and the benefit of this disclosure would understand how to dimension the conduit 54 and the insert 58 to achieve the desired interference fit. In another example, a welding or brazing process is used to secure the insert 58 inside the conduit 58.

In this example, the fuel cell fluid flows into the energy dissipation device 10 from the manifold 14 through the first opening 66. The fuel cell fluid flows through the first opening 66 in the longitudinal direction. After entering the energy dissipation device 10, the insert 58 redirects the fuel cell fluid and forces the fuel cell fluid to flow through a helical fluid communication path 82. The insert 58 and the inner wall 78 of the conduit 54 establish the helical fluid communication path 82.

In this example, the width W of the helical fluid communication path 82 is about 0.068 inches (0.173 cm), and the height H of the fluid communication path 82 is about 0.218 inches (0.554 cm). In this example, the conduit 54 is between 1.5-2.0 inches (3.81-5.08 cm) long. The insert 58 is slightly shorter. In another example, the insert 58 is the same length as the conduit 54.

A flow path P shows the fuel cell fluid's path through a portion of the helical fluid communication path. Notably, when flowing through the helical fluid communication path 82, the fuel cell fluid flows helically in a substantially circumferential direction relative to the longitudinal direction. After traveling through the helical fluid communication path 82, the fuel cell fluid exits the energy dissipation device 10 through the second opening 70 and flows through the hoses 20 to the cooling plates 24. The helical fluid communication path is considered a spiral flow path in some examples.

Travelling through the helical fluid communication path 82 slows the flow of the fuel cell fluid. Accordingly, the pressure of the fuel cell fluid entering the energy dissipation device 10 through the first opening 66 is greater than the pressure of the fuel cell fluid exiting the energy dissipation device 10 through the second opening 70. In one specific example, the energy dissipation device 10 provides a 1.74 psi (12 kPa) pressure drop between the fuel cell fluid entering the first opening 66 and exiting the second opening 70.

Using the energy dissipation devices 10 facilitates a relatively consistent delivery of the fuel cell fluid to each of the cooling plates 24 within the fuel cell stack assembly 18. That is, the energy dissipation devices 10 help prevent more of the fuel cell fluid from being delivered to some of the cooling plates 24, which ensures that the removal of thermal energy by the fuel cell fluid will be relatively consistent.

Figure 6:
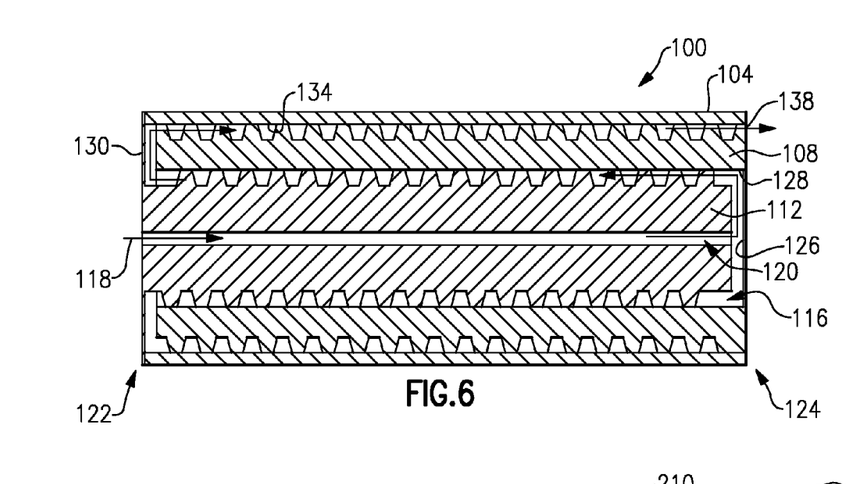
FIG. 6 shows a section view of another example energy dissipation device.

Referring now to FIG. 6, another example energy dissipation device 100 includes a conduit 104, a first insert 108, and a second insert 112. The first insert 108 includes a recess 116. The recess 116 is configured to receive the second insert 112.

The second insert 112 establishes a central bore 120. The central bore 120 establishes a portion of a fluid communication path 118. More specifically, the central bore 120 is configured to communicate a cooling fluid from a first end portion 122 of the energy dissipation device 100 to an opposing, second end portion 124 of energy dissipation device 100. The central bore 120 receives fuel cell fluid from a manifold (not shown).

After the fuel cell fluid exits the central bore 120 at the second end portion 124, the fuel cell fluid contacts a bottom 126 of the recess 116, which causes the fuel cell fluid to flow radially outward, and away from the central bore 120.

The fuel cell fluid then enters an inner helical section of the fluid communication path 118 established between the second insert 112 and an inner wall 128 of the first insert 108. The fuel cell fluid communicates along the inner helical section and moves circumferentially around the central bore 120 until the fuel cell fluid again reaches the first end portion 122.

The fuel cell fluid then contacts a radially extending fin 130 of the conduit 104. The fin 130 directs the fuel cell fluid radially outward to an outer helical section of the fluid communication path 118 established between an inner wall 134 of the conduit 104, and the first insert 108. The fuel cell fluid communicates along the outer helical section of the communication path until exiting the energy dissipation device 110 at a second opening 138. The fuel cell fluid communicates through the second opening 138 to the hose (not shown), which communicates to the fuel cell fluid to a cooling plate.

Notably, in the example energy dissipation device 110, fluid communicates in a first longitudinal direction through the conduit 104 and in a second longitudinal direction through the conduit 104. The first longitudinal direction is opposite the second longitudinal direction.

The inserts 108 and 112 of the energy dissipation device 110 are threaded rods in one example. The inserts 108 and 112 are both machined to provide the central bore 120 and the recess 116, respectively.

Figure 7:
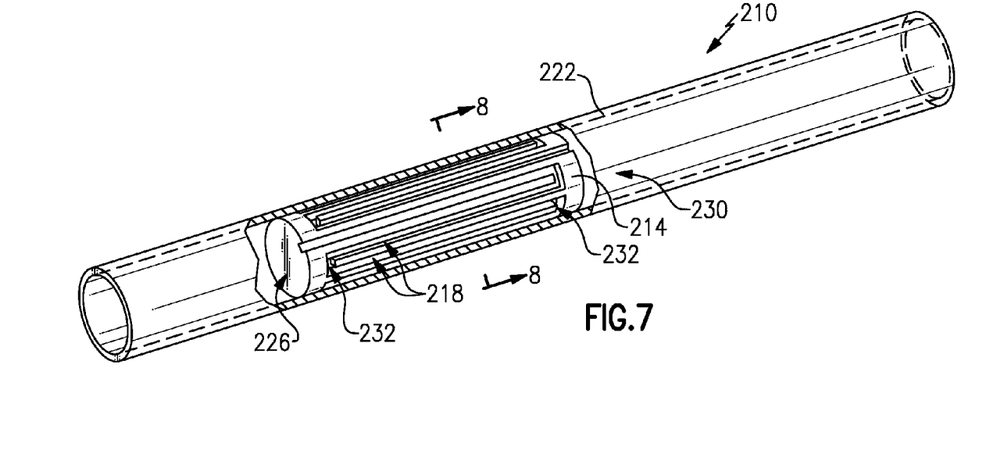
FIG. 7 shows a partial cutaway view of another example energy dissipation device.
Figure 8:
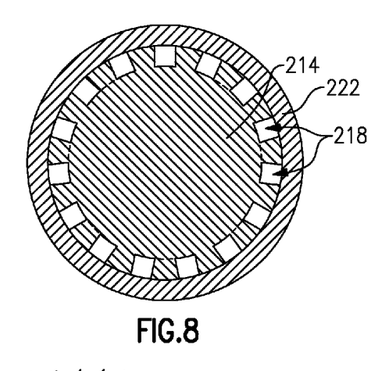
FIG. 8 shows an example cross-sectional view at line 6-6 in FIG. 7.

Referring now to FIGS. 7 and 8, another example energy dissipation device 210 includes an insert 214 having U-shaped passages 218 machined within an outer surface of the insert 214.

The insert 214 is received within a conduit 222. The U-shaped passages 218 extend in a longitudinal direction between a first end 226 and a second end 230 of the insert 214. Portions 232 of the U-shaped passages 218 force the fuel cell fluid to travel in a helical or circumferential direction relative to the longitudinal direction. In this example, the passages 218 have a square cross-section. The U-shaped passages 218 extend primarily in the longitudinal direction. That is, the circumferential portions form only a small portion of the overall length of the passages 218.

The passages 218 include portions causing the fuel cell fluid to travel in the longitudinal direction, and portions causing the fuel cell fluid to travel in a direction opposite the longitudinal direction.

The passages 218 can be adjusted in the axial, radial, or circumferential directions, for example, to have more or fewer U-shaped passages. Varying the number of U-shaped passages and the cross-sectional area of the passages achieves different types of pressure drops without increasing the size of the insert 214.

Figure 8A:
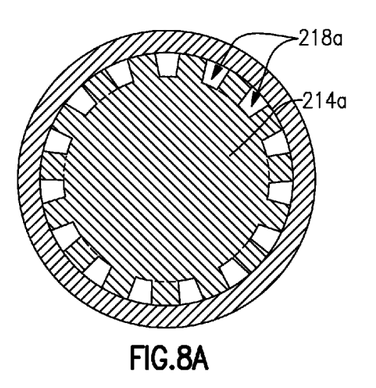
FIG. 8A shows a cross-sectional view of another example energy dissipation device.
Figures 8B, 8C, 9, 10:
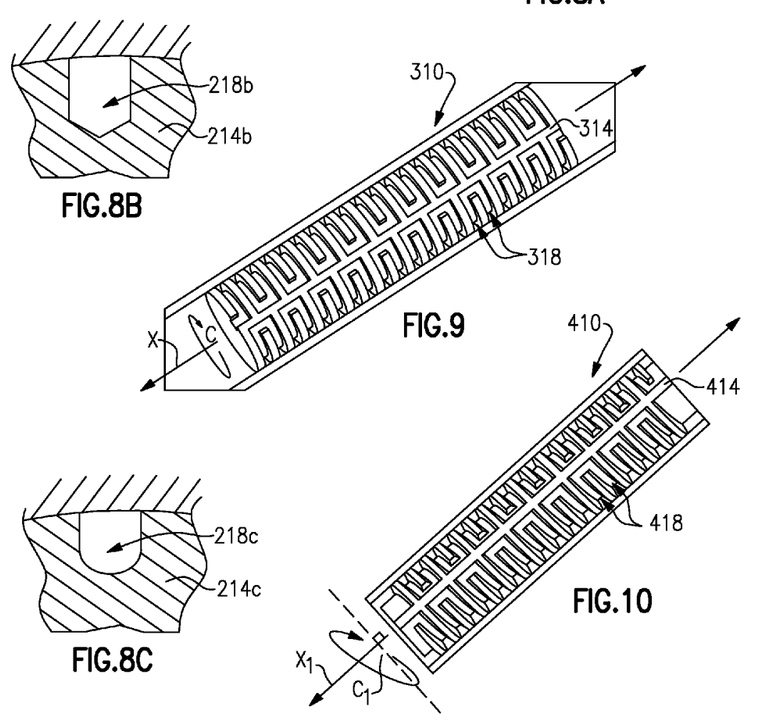
FIG. 8B shows a close-up view of another example energy dissipation device.
FIG. 8C shows a close-up view of yet another example energy dissipation device.
FIG. 9 shows a partial cutaway view of yet another example energy dissipation device.
FIG. 10 shows a partial cutaway view of still another example energy dissipation device.

Referring to FIG. 8A, another example insert 214a defines passages 218a that have a trapezia section. FIG. 8B shows a close-up view of another example insert 214b defining passages 218b that have an irregular pentagon section. FIG. 8C a close-up view of yet another example insert 214c defining passages 218c that have a U-shaped section.

Referring to FIGS. 9 and 10 with continuing reference to FIG. 7, another example energy dissipation device 310 includes an insert 314 extending in a longitudinal direction X. The insert has a plurality of U-shaped passages 318 that extend primarily in a helical or circumferential direction C relative to the longitudinal direction X.

Yet another example energy dissipation device 410 includes an insert 414 extending in a longitudinal direction $X_1$. The insert 414 has a plurality of U-shaped passages 418 that extend primarily in a substantially helical or circumferential direction $C_1$ relative to the longitudinal direction $X_1$.

Notably, the U-shaped passages 218, 318, and 418 include portions causing the fuel cell fluid to travel circumferentially in a first direction, and to travel circumferentially in second direction that is opposite the first direction.

In one example, the U-shaped passages 218, 318, and 418 are combined with the helical fluid communication path of the insert 58 (FIG. 4). An example of this type of insert (not shown) would include a fluid communication path having a helical portion configured to direct the fuel cell fluid primarily circumferentially around the insert and a U-shaped passage portion configured to direct the fluid primarily longitudinally relative to the insert.

Features of the disclosed examples include using a relatively simple structure having a compact volume to dissipate energy from a fuel cell fluid. The disclosed examples are also relatively easy to manufacture and assemble. Yet another feature of the disclosed examples is the insert's introduction of a pressure drop in a relatively compact volume while maintaining a relatively large opening for flow. As can be appreciated, this feature discourages plugging.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An energy dissipation device for controlling flow of a fuel cell fluid, comprising:
   a conduit extending in a longitudinal direction between a first opening and a second opening; and
   a first flow control insert configured to be received within the conduit, wherein the first flow control insert is configured to cause a fuel cell fluid to flow helically about the first flow control insert relative to the longitudinal direction in a first direction; and
   a second flow control insert configured to be received within the conduit and arranged coaxially with the first flow control insert, wherein the second flow control inset is configured to cause the fuel cell fluid to flow helically about the second flow control inset relative to the longitudinal direction in a second direction opposite a first direction, wherein the fuel cell fluid is a coolant.

2. The energy dissipation device of claim 1, wherein the first flow control insert comprises a threaded rod.

3. The energy dissipation device of claim 2, wherein a diameter of the threaded rod is larger than an inner dimension of the conduit such that the threaded rod is held relative to the conduit by an interference fit.

4. The energy dissipation device of claim 1, wherein the first flow control insert comprises a recess configured to receive the second flow control insert.

5. The energy dissipation device of claim 4, wherein the flow control insert and an inner wall of the conduit together establish an outer helical flow path, and the second flow control insert and an inner wall of the flow control insert together establish an inner helical flow path.

6. The energy dissipation device of claim 5, wherein the fuel cell fluid moves toward the second opening when communicated along the outer helical flow path and toward the first opening when communicated along the inner helical flow path.

7. The energy dissipation device of claim 1, wherein a pressure of the fuel cell fluid entering the conduit through the first opening is greater than a pressure of the fuel cell fluid exiting the conduit through the second opening.

8. The energy dissipation device of claim 1, wherein the fuel cell fluid comprises water.

9. A fuel cell arrangement, comprising:
   a fuel cell fluid supply;
   a fuel cell stack; and
   an energy dissipation device configured to control the flow of a fuel cell fluid between the fuel cell fluid supply and the fuel cell stack, the energy dissipation device including a first insert that causes the fuel cell fluid to flow helically about the first insert through the energy dissipation device in a first direction, the energy dissipation device further including a second insert that causes the fuel cell fluid to flow helically about the second insert through the energy dissipation device in a second direction opposite a first direction, the first insert dissipation device in a second direction opposite a first direction, the first insert arranged coaxially with the second insert.

10. The fuel cell arrangement of claim 9, wherein the first insert establishes a recess configured to receive the second insert.

11. The fuel cell arrangement of claim 10, wherein the energy dissipation device includes a first flow path section configured to communicate the fuel cell fluid helically toward the fuel cell stack and a second flow path section configured to communicate the fuel cell fluid helically away from the fuel cell stack.

12. The fuel cell arrangement of claim 11, wherein the energy dissipation device extends in a longitudinal direction, and the energy dissipation device includes a third flow path section configured to communicate the fuel cell fluid through the second insert in the longitudinal direction.

13. The fuel cell arrangement of claim 11, wherein the fuel cell stack comprises a multiple of phosphoric acid fuel cells.

14. A method of controlling a fuel cell fluid flow, comprising:
receiving a fuel cell fluid at a conduit;
restricting flow of the fuel cell fluid by directing the fuel cell fluid to move helically about a first threaded insert within the conduit;
communicating the fuel cell fluid from the conduit to a fuel cell stack;
directing the fuel cell fluid to move helically in a first longitudinal direction using the first threaded insert; and
directing the flow to move helically in a second longitudinal direction using a second threaded insert at least partially received within the first threaded insert, the second longitudinal direction opposite the first longitudinal direction.

15. The method of claim 14, wherein the first threaded insert is held within the conduit using an interference fit.

16. The method of claim 14, wherein the fuel cell fluid is water.

17. An example energy dissipation device for controlling fuel of a fuel cell fluid, comprising:
a conduit extending in a longitudinal direction between a first opening and a second opening; and
a first flow control insert configured to be received within the conduit, wherein the first flow control insert is configured to cause a fuel cell fluid to flow in a first direction that is the same as the longitudinal direction and to flow helically about the first flow control insert relative to the longitudinal direction; and
a second flow control insert arranged coaxially with the first flow control insert and configured to cause the fuel cell fluid to flow in a second direction that is opposite the longitudinal direction and to flow helically about the second flow control insert relative to the longitudinal direction.

* * * * *